US012623471B2

(12) United States Patent
Hoshi

(10) Patent No.: US 12,623,471 B2
(45) Date of Patent: May 12, 2026

(54) MEDIUM ISSUING DEVICE, MEDIUM ISSUING SYSTEM AND MEDIUM ISSUING METHOD

(71) Applicant: NIDEC INSTRUMENTS CORPORATION, Nagano (JP)

(72) Inventor: Tomohiro Hoshi, Nagano (JP)

(73) Assignee: NIDEC INSTRUMENTS CORPORATION, Nagano (JP)

(*) Notice: Subject to any disclaimer, the term of this patent is extended or adjusted under 35 U.S.C. 154(b) by 265 days.

(21) Appl. No.: 18/490,055

(22) Filed: Oct. 19, 2023

(65) Prior Publication Data

US 2024/0131856 A1 Apr. 25, 2024
US 2024/0227419 A9 Jul. 11, 2024

(30) Foreign Application Priority Data

Oct. 20, 2022 (JP) ................................ 2022-168225

(51) Int. Cl.
*B41J 11/42* (2006.01)
*B41J 2/325* (2006.01)

(52) U.S. Cl.
CPC .............. *B41J 11/42* (2013.01); *B41J 2/325* (2013.01)

(58) Field of Classification Search
CPC ... B41J 11/42; B41J 2/325; B41J 11/00; B41J 11/0005; B41J 11/001; B41J 11/0015; B41J 11/002; B41J 11/0021; B41J 11/00212; B41J 11/00218; B41J 11/00244; B41J 11/0025; B41J 11/003; B41J 11/0035; B41J 11/004; B41J 11/0045; B41J 11/005; B41J 11/0055; B41J 11/006; B41J 11/0065; B41J 11/007; B41J 11/008; B41J 11/0095; B41J 11/425; B41J 11/485; B41J 11/51
See application file for complete search history.

(56) References Cited

U.S. PATENT DOCUMENTS 9,174,468 B2 * 11/2015 Tomomatsu .......... B41J 15/042

FOREIGN PATENT DOCUMENTS

JP H02273268 A 11/1990

* cited by examiner

*Primary Examiner* — Kristal Feggins
(74) *Attorney, Agent, or Firm* — CANTOR COLBURN LLP

(57) ABSTRACT

A medium issuing device includes a medium conveyance part, a print head, a sensor disposed on an upstream side of a conveyance passage with respect to the print head, a head drive part which moves the print head between a standby position and a printing position, a ribbon feeding part, and a control part. The control part controls so that, when detected that the sensor is turned on by a medium, the medium is conveyed at a first speed by the medium conveyance part, and the print head is started to move to the printing position by the head drive part and, in a case that a high speed mode is set, after the print head is contacted with the medium, the medium conveyance part and the ribbon feeding part are synchronously driven so that printing to the medium is performed at the second speed higher than the first speed.

5 Claims, 4 Drawing Sheets

MEDIUM ISSUING DEVICE, MEDIUM ISSUING SYSTEM AND MEDIUM ISSUING METHOD

CROSS REFERENCE TO RELATED APPLICATION

The present invention claims priority under 35 U.S.C. § 119 to Japanese Application No. 2022-168225 filed Oct. 20, 2022, the entire content of which is incorporated herein by reference.

TECHNICAL FIELD

At least an embodiment of the present invention may relate to a medium issuing device, a medium issuing system and a medium issuing method for especially issuing a medium such as a card.

BACKGROUND

Conventionally, a card issuing system has been existed which issues a card-shaped recording medium (hereinafter, simply referred to as a "card"). Such a card issuing system is structured so that a medium issuing device which issues a card is connected with a host apparatus such as an ATM (Automated Teller Machine). Such a medium issuing device often includes a hopper unit in which cards before issue are laminated and accommodated, a printer which prints on a card, and the like. In addition, in a printer for a card and the like, a system is often used in which an ink ribbon is heated by a print head in a thermal system to transfer to a card. In such a medium issuing device, it is required that printing and issuing of a card are performed at a high speed, in other words, a time required for printing and issuing of a card is reduced.

In the conventional thermal transfer printing described in Japanese Patent Laid-Open No. Hei 2-273268 (Patent Literature 1), a control circuit for adjusting a paper feeding speed based on a printing mode of a printer and a means capable of changing the paper feeding speed by a drive circuit for a paper feed motor are provided. In the technique described in Patent Literature 1, two paper feeding modes are provided, in other words, a paper feeding mode for a recording paper whose load is light, for example, a dedicated paper sheet such as thermosensitive paper or transfer paper, and a paper feeding mode for a thick paper sheet whose load is large due to large thickness. In an initial state, a high-speed paper feeding mode is set so as to cope with a thin paper such as a printer dedicated paper sheet and, in a case that a postcard mode, a cut-sheet feeder mode or the like is set, a low-speed paper feeding mode is set.

In the technique described in Patent Literature 1, a "low-speed feeding mode" is required for a card having a certain thickness and thus, a printing speed of a medium such as a card is unable to increase in a medium issuing device.

SUMMARY

In view of the problem described above, at least an embodiment of the present invention may advantageously provide a medium issuing device which is capable of reducing a printing time to a card.

According to at least an embodiment of the present invention, there may be provided a medium issuing device for printing and issuing a medium which includes a conveyance passage where the medium is conveyed, a medium conveyance part which conveys the medium in the conveyance passage, a print head which brings an ink ribbon into contact with the medium conveyed in the conveyance passage by the medium conveyance part and prints on the medium, a sensor which is disposed on an upstream side of the conveyance passage with respect to the print head, a head drive part which moves the print head between a standby position and a printing position, a ribbon feeding part which feeds out the ink ribbon, and a control part. The control part controls so that, when detected that the sensor is turned on, the medium is conveyed at a first speed by the medium conveyance part, and the print head is started to move to the printing position by the head drive part and, in a case that a high speed mode which prints at a second speed higher than the first speed is set, after the print head is contacted with the medium, the medium conveyance part and the ribbon feeding part are synchronously driven so that printing to the medium is performed at the second speed. According to this configuration, a medium is conveyed at the first speed and thus, the medium and the print head can be surely aligned and, after aligned, the conveyance speed is set to the second speed and thereby, a printing time can be reduced.

In the medium issuing device in accordance with an embodiment of the present invention, when the control part receives an instruction that the medium is taken out from a medium storage part in which the medium is stored, the control part starts to acquire printing data to be printed by the print head from a host apparatus. According to this configuration, before a medium is conveyed to a printing start position, most printing image data can be received.

In the medium issuing device in accordance with an embodiment of the present invention, in a case that a normal mode in which printing is performed at the first speed is set, when the print head is contacted with the medium, the control part stops the medium conveyance part and the ribbon feeding part until acquisition of the printing data is completed and, in a case that the high speed mode is set, when the print head is contacted with the medium, the control part controls so as not to stop the medium conveyance part and the ribbon feeding part even in the middle of acquisition of the printing data. According to this configuration, in the high speed mode, printing can be performed at a high speed without stopping conveyance of a medium.

In the medium issuing device in accordance with an embodiment of the present invention, the control part calculates an expected acquisition time of the printing data based on an attribute of the printing data and a communication speed with the host apparatus and, in a case that a moving time until the medium which is conveyed is contacted with the print head is shorter than the expected acquisition time, when the print head is contacted with the medium, the control part controls so as not to stop the medium conveyance part and the ribbon feeding part. According to this configuration, conveyance of a medium is not stopped at a printing start position and thus, printing can be performed at a high speed.

According to at least an embodiment of the present invention, there may be provided a medium issuing system which includes a medium issuing device for printing and issuing a medium and a host apparatus for transmitting printing data for the medium issuing device. The host apparatus includes a printing data creation part which creates the printing data, a mode setting part which sets a normal mode in which printing is performed at a first speed and a high speed mode in which printing is performed at a second speed higher than the first speed, and a transmission part which transmits the printing data to the medium issuing device. The medium issuing device includes a conveyance passage where the medium is conveyed, a medium conveyance part which conveys the medium in the conveyance passage, a print head which brings an ink ribbon into contact with the medium conveyed in the conveyance passage by the medium conveyance part and prints on the medium, a sensor which is disposed on an upstream side of the conveyance passage with respect to the print head, a head drive part which moves the print head between a standby position and a printing position, a ribbon feeding part which feeds out the ink ribbon, and a control part. The control part controls so that, when detected that the sensor is turned on, the medium is conveyed at a first speed by the medium conveyance part, and the print head is started to move to the printing position by the head drive part and, in a case that a high speed mode is set, after the print head is contacted with the medium, the medium conveyance part and the ribbon feeding part are synchronously driven so that printing to the medium is performed at the second speed. According to this configuration, a medium is conveyed at the first speed and thus, the medium and the print head can be surely aligned and, after aligned, the conveyance speed is set to the second speed and thereby, a printing time can be reduced.

In the medium issuing system in accordance with an embodiment of the present invention, in a case that the printing data is data including black-and-white data whose storage capacity is smaller than a specific capacity, the mode setting part sets the high speed mode. According to this configuration, printing data whose storage capacity is small can be changed in a high speed mode and printed.

Further, according to at least an embodiment of the present invention, there may be provided a medium issuing method which is executed by a medium issuing device for printing and issuing a medium. The medium issuing device includes a conveyance passage where the medium is conveyed, a medium conveyance part which conveys the medium in the conveyance passage, a print head which brings an ink ribbon into contact with the medium conveyed in the conveyance passage by the medium conveyance part and prints on the medium, a sensor which is disposed on an upstream side of the conveyance passage with respect to the print head, a head drive part which moves the print head between a standby position and a printing position, a ribbon feeding part which feeds out the ink ribbon, and a control part. The control part controls so that, when detected that the sensor is turned on, the medium is conveyed at a first speed by the medium conveyance part, and the print head is started to move to the printing position by the head drive part and, in a case that a high speed mode is set, after the print head is contacted with the medium, the medium conveyance part and the ribbon feeding part are synchronously driven so that printing to the medium is performed at the second speed. According to this configuration, a medium is conveyed at the first speed and thus, the medium and the print head can be surely aligned and, after aligned, the conveyance speed is set to the second speed and thereby, a printing time can be reduced.

Effects of the Invention

According to an embodiment of the invention, a medium is conveyed at the first speed by the medium conveyance part and, when detected that the sensor is turned on, the print head is started to move and, after the print head is contacted with the medium, the medium conveyance part and the ribbon feeding part are controlled to be synchronously driven so that printing to the medium is performed at the second speed. Therefore, a medium issuing device can be obtained in which, in a case that printing to a card is desired to perform at a high speed, a high speed printing can be performed and, as a result, a printing time to a card can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

Embodiments

[Configuration of Card Issuing System "X"]

A configuration of a card issuing system "X" in accordance with an embodiment of the present invention will be described below with reference to FIGS. 1, FIG. 2A and FIG. 2B. A card issuing system "X" in this embodiment is an example of a medium issuing system for issuing a medium. Specifically, the card issuing system "X" is a device for issuing a new card 4 (medium). The card issuing system "X" includes, for example, an ATM having a card issuing function, a terminal of a Kiosk, a ticket issuing system of transportation facilities, a point card issuing system of a convenience store or the like, a member card issuing system of a retail store, a card issuing and payment system of a game machine, an entry/exit management system, a ticket issuing system of a vehicle, a management system of a parking lot (hereinafter, simply referred to as an "ATM or the like").

Figure 1:
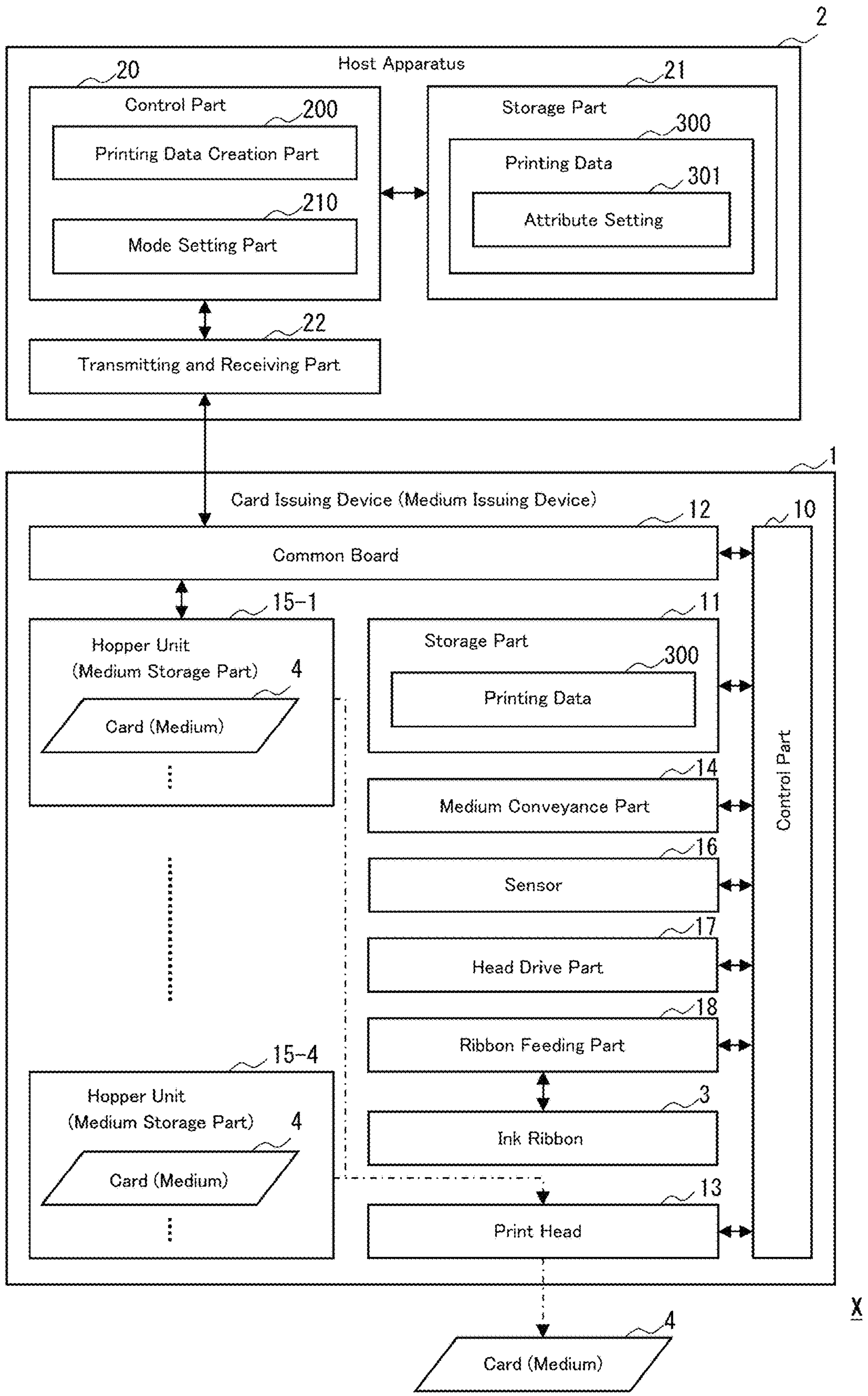
FIG. 1 is a system configuration diagram showing a card issuing system in accordance with an embodiment of the present invention.

As shown in FIG. 1, specifically, the card issuing system "X" includes a card issuing device 1 and a host apparatus 2. In this embodiment, the card issuing device 1 and the host apparatus 2 are connected with each other by a USB (Universal Serial Bus) or the like.

The card issuing device 1 is a device which includes a printing and issuing printer for printing information required for a card 4 and being issued based on an instruction from the host apparatus 2, a card reader, a hopper unit 15 which accommodates cards 4, and the like. In this embodiment, communication between the card issuing device 1 and the host apparatus 2 is, for example, performed through a USB, a LAN (Local Area Network), a serial communication (RS-232C) or the like.

In this embodiment, the host apparatus 2 is an information processing apparatus which controls the card issuing device 1 to realize respective functions of an ATM or the like. Specifically, the host apparatus 2 is, for example, a main body apparatus of an ATM or the like and includes a control operation apparatus such as a PC (Personal Computer) for control, a tablet terminal or a cellular phone. Therefore, the host apparatus 2 executes application software (hereinafter, simply referred to as an "application") for realizing a function of the card issuing system "X". In this embodiment, the host apparatus 2 is connected with the card issuing device 1 which is an object to be controlled. In addition, the host apparatus 2 is capable of being connected with a network, various peripheral devices and the like.

A card 4 in this embodiment is an example of a medium corresponding to the card issuing system "X" in accordance with this embodiment. A card 4 is, for example, a non-contact type IC (integrated circuit) card, a contact type IC card and/or a magnetic card having a magnetic stripe. A card 4 is, for example, a rectangular-shaped card made of vinyl chloride whose thickness is about 0.7-0.8 mm. In a case that a card 4 is a magnetic card, the card 4 is, for example, formed with a magnetic stripe where magnetic data is recorded. Further, in a case that a card 4 is a non-contact type IC card and/or a contact type IC card, an IC chip is, for example, built in the card 4. In accordance with an embodiment of the present invention, a card 4 may be provided with both of an IC chip and a magnetic stripe. In addition, in a case that a card 4 is a non-contact type IC card, a short-distance wireless communication R/W (Read/Write) antenna may be built in the card 4. In this embodiment, a card 4 may be a PET (polyethylene terephthalate) card whose thickness is about 0.18-0.36 mm or may be a paper card having a predetermined thickness.

An ink ribbon 3 corresponding to the card issuing system "X" in this embodiment may be, for example, a heat sublimation type or a thermal transfer type ink ribbon for printing a color image or a black-and-white image on a card 4. In addition, in this embodiment, the ink ribbon 3 may be color ink ribbons including films of yellow, magenta, cyan and black as a regulation. The color ink ribbon may further include an overcoat layer film for protecting a printing face. In addition, the ink ribbon 3 may include a ribbon of only black and a special ribbon (hereinafter, referred to as a "special color") such as a forgery prevention color containing special metal particles or the like, metal color, fluorescent color, hologram, and a thermal expansion film expanded by heat to perform printing for discrimination by utilizing braille or protrusions and recesses. In addition, the ink ribbon 3 may also include a multi-time ink ribbon (usable a plurality of times). In this embodiment, the ink ribbon 3 may be stuck with an RFID tag (hereinafter, referred to as a "wireless tag") in a communication system (ISO 14443) similar to a non-contact type IC card, and the ink ribbon information including its type, ID and serial number may be managed. The ink ribbon information may be acquired in the host apparatus 2 from the card issuing device 1.

(System Configuration of Card Issuing Device 1)

Next, a control configuration of the card issuing device 1 will be described below. The card issuing device 1 includes units such as a common board 12, a control part 10, a storage part 11, a print head 13, a medium conveyance part 14, a hopper unit 15, a sensor 16, a head drive part 17 and a ribbon feeding part 18.

The common board 12 is a device for connecting the hopper unit 15 and the print head 13 with the host apparatus 2. In this embodiment, the common board 12 is, for example, a dedicated circuit, a circuit of a USB board and an interface which are provided on a board of the card issuing device 1. For example, the common board 12 includes a control operation part and a hub circuit of USB, and the common board 12 is connected with the hopper unit 15 and the control part 10 through the hub.

Specifically, the common board 12 is capable of performing reception of a command (instruction) from the host apparatus 2 and a response to the command through a USB cable. In addition, the common board 12 is capable of storing printing data 300 acquired from the host apparatus 2 in the storage part 11 by DMA (Direct Memory Access) or the like.

The control part 10 is a main control operation part which controls respective parts of the card issuing device 1. The control part 10 may include, for example, a CPU (Central Processing Unit), an MPU (Micro Processing Unit), a GPU (Graphics Processing Unit), a DSP (Digital Signal Processor), an ASIC (Application-Specific Integrated Circuit) or the like. When the control part 10 receives an instruction (command) from the host apparatus 2 for issuing and printing of a new card 4, the control part 10 performs control for taking-out (discharge) of a card 4 from the hopper unit 15, conveyance, printing, discharge and reading/writing of the card 4 based on the instruction.

The storage part 11 is a non-transitory recording medium which stores a control program and various data including encrypted data. The storage part 11 includes, for example, a RAM (Random Access Memory) and a ROM (Read Only Memory). The ROM includes a flash memory and other nonvolatile semiconductor memories. In addition, the ROM may be configured as an SSD (Solid State Drive) or an eMMC (embedded Multi Media Card). In accordance with an embodiment of the present invention, the storage part 11 may include a magnetic recording medium such as an HDD (Hard Disk Drive), an optical recording medium such as an optical disk, and other non-transitory recording media.

The print head 13 is a thermal transfer type or sublimation type thermal head or the like in a card printer which reads out printing data 300 to print a card 4 according to drive of the medium conveyance part 14. In this embodiment, the print head 13 may be a heater array which performs printing by melting or sublimating ink included in an ink ribbon 3 to fix the ink to the card 4. The print head 13 is capable of bringing an ink ribbon 3 into contact with a new card 4 which is conveyed from an inside of the hopper unit 15 to print an image or characters with photograph quality on a surface of the card 4.

Specifically, the print head 13 prints, for example, a bitmap image like the printing data 300 as described below in edge-less, double-sided, black-and-white, color or the like at several-hundred dpi (dots per inch) or the like. In this embodiment, an example is described in which "dpi" is 300 dpi in a case that printing data 300 having an original size described below is normally printed. In addition, in this embodiment, the print head 13 may be capable of performing printing which uses a special ink ribbon 3 such as an overcoat protecting a printing layer, a metal color, a fluorescent color, hologram, and a thermal expansion film (hereinafter, referred to as "special printing").

The medium conveyance part 14 conveys a card 4 in a conveyance passage formed in an inside of the card issuing device 1. The medium conveyance part 14 includes a conveyance mechanism such as a drive roller and a platen roller and conveys a card 4 in a front and rear direction of the conveyance passage. The conveyance mechanism is connected with a drive means such as a common stepping motor and an encoder through a power transmission mechanism. In this embodiment, as described below, in a conveyance direction of a card 4 in the conveyance passage, a side where the card 4 is issued and discharged is referred to as a front direction side, and an internal side where the hopper unit 15 stored with cards 4 is arranged is referred to as a rear direction side. Further, a side in a gravity direction which is vertical to the conveyance direction of the card 4 is referred to as a lower direction side, and a side opposite to the lower side is referred to an upper direction side.

The hopper unit 15 is a medium storage part such as a card hopper in which a plurality of new (unused) cards 4 before issue are accumulated and accommodated. In this embodiment, as an example, four hopper units 15-1 through 15-4 are provided. Hereinafter, one of the hopper units 15-1 through 15-4 may be simply referred to as the hopper unit 15.

The hopper unit 15 is capable of discharging a card 4 stored in its inside to the print head 13 (to the front direction side) along the conveyance passage by control of the control part 10 through an instruction from the host apparatus 2. In addition, the hopper unit 15 is also capable of collecting a card 4 having been used and to be collected is dropped to a collection box which is separately provided. The card 4 collected in the collection box is taken out for safekeeping by a manager of the ATM or the like.

The sensor 16 is a sensor 16 which detects a position of a card 4 which is conveyed in an inside of the card issuing device 1. The sensor 16 may include, for example, an optical type sensor 16 having a light emitting element (photo diode) and a light receiving element (photo sensor 16), a piezoelectric sensor 16 which detects a pressing pressure when a card 4 is contacted, an electrostatic capacitance sensor 16 which detects electrostatic capacity of a card 4, a physical switch and the like. In this embodiment, the sensor 16 is, as an example, a reference sensor which is disposed on an upstream side of the conveyance passage with respect to the print head 13 and is used for timing matching (aligning) at a time of printing of a card 4.

In accordance with an embodiment of the present invention, the sensor 16 may be disposed at a plurality of different positions in the conveyance passage in addition to the above-mentioned position. When other sensors 16 described above are provided in the conveyance passage, a position of a card 4 in the conveyance passage can be detected in detail. In addition, a contact sensor may be provided which is provided directly under the print head 13 to detect that the print head 13 is contacted with a card 4 or that only the print head 13 is contacted with the conveyance passage.

The head drive part 17 includes a mechanism for moving the print head 13 between a standby position and a printing position, and a drive means such as a motor or a solenoid. In this embodiment, the head drive part 17 includes a head lifting mechanism for lifting and lowering the print head 13 in an upper and lower direction. In a case that a card 4 is not printed, the head drive part 17 holds the print head 13 at a standby position on an upper direction side with respect to the conveyance passage. In this state, when a card 4 is to be issued and printed, the print head 13 can be moved downward to a printing position at a predetermined speed by control of the control part 10. Movement from the standby position to the printing position requires a certain specific time of about several tens of milliseconds through several seconds which has been previously measured.

The ribbon feeding part 18 is a ribbon feed mechanism which feeds out the ink ribbon 3 having been set. In this embodiment, the ribbon feed mechanism also includes a drive means such as a stepping motor. As a result, a position of the ink ribbon 3 can be accurately controlled in synchronization with a position of the card 4.

The card issuing device 1 may be also provided with a function as a card reader which is capable of taking a card 4 of a user of an ATM or the like into an inside of the device by driving a motor of the medium conveyance part 14 to perform reading or writing. In this case, the card issuing device 1 may be, for example, capable of performing read/write of an IC chip and read/write of a magnetic stripe.

(System Configuration of Host Apparatus 2)

Specifically, the host apparatus 2 includes a control part 20, a storage part 21, a transmitting and receiving part 21 and the like.

The control part 20 is a control operation part which includes a CPU, MPU, GPU, DSP, ASIC or the like.

The storage part 21 is a recording medium including a RAM and a ROM. The ROM includes a flash memory and other nonvolatile semiconductor memories. In addition, the storage part 21 may include other non-transitory recording media such as a magnetic recording medium, e.g., an HDD (Hard Disk Drive), and an optical recording medium, e.g., an optical disk.

The transmitting and receiving part 22 is a chip set (Chipset), a circuit such as an I/O (Input/Output) and a physical interface for connecting with an external device. The transmitting and receiving part 22 includes a general-purpose serial interface such as a USB, a parallel interface, a digital video interface and the like for connecting with the card issuing device 1. In addition, the transmitting and receiving part 22 also includes a physical layer of a network interface and the like for connecting with a network.

Specifically, the transmitting and receiving part 22 is capable of transmitting and receiving various commands and data to and from the card issuing device 1. In this embodiment, the transmitting and receiving part 22 is a transmission part which transmits printing data 300 to the card issuing device 1. In addition, the transmitting and receiving part 22 may be connected with peripheral devices such as a display, e.g., an LCD (Liquid Crystal Display) panel or an organic EL (electroluminescence) panel provided in an ATM or the like, a touch panel and various buttons.

Next, an outward appearance structure of the card issuing device 1 in accordance with an embodiment of the present invention will be described below with reference to the perspective views shown in FIG. 2A and FIG. 2B. FIG. 2A shows hopper units 15-1 through 15-4, and FIG. 2B shows a positional relationship between the card issuing device 1 on which the hopper units are mounted and the ink ribbon 3.

Figure 2A:
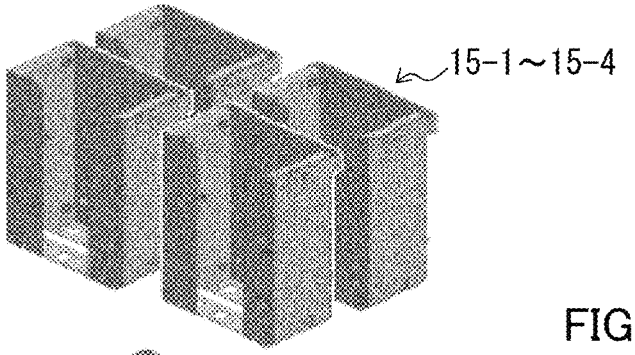
FIG. 2A and FIG. 2B are perspective views showing an outward appearance of the card issuing system shown in FIG. 1.
Figure 2B:
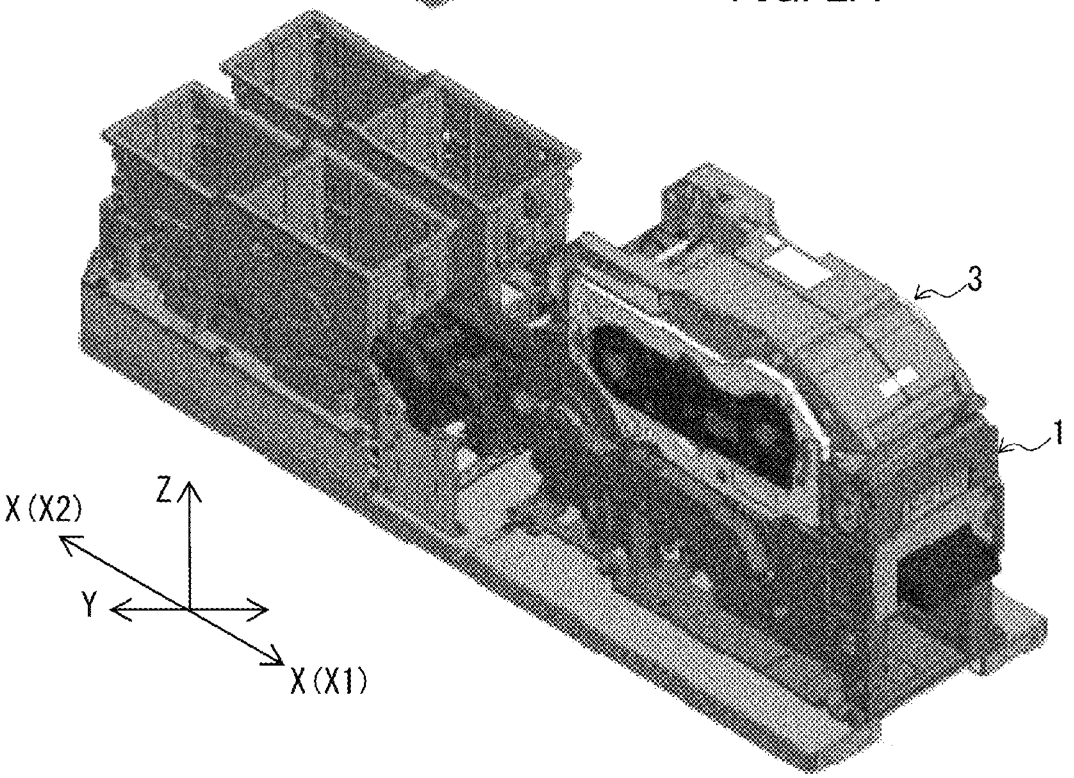

In FIG. 2A and FIG. 2B, the "X" direction is a front and rear direction of the card issuing device 1, the "Z" direction is an upper and lower direction of the card issuing device 1, and the "Y" direction is a right and left direction of the card issuing device 1 which is perpendicular to the front and rear direction and the upper and lower direction. The "X1" direction side in the front and rear direction is a front end side (front side) of the card issuing device 1, and the "X2" direction side which is its opposite side is a rear side (back side) of the card issuing device 1. The card issuing device 1 is mounted on the host apparatus 2 so that a front end side of the card issuing device 1 is disposed on a front face side of an ATM or the like.

[Functional Configuration of Card Issuing System "X"]

Functional configurations for performing printing and issuing of a card 4 in the card issuing system "X" in accordance with an embodiment of the present invention will be described below with reference to FIG. 1. The control part 20 of the host apparatus 2 includes a printing data creation part 200 and a mode setting part 210. The storage part 11 of the card issuing device 1 stores printing data 300. The storage part 21 of the host apparatus 2 stores the printing data 300.

The printing data creation part 200 creates printing data 300 which is to be printed when a card 4 is issued and stores the data in the storage part 21. In addition, the printing data creation part 200 executes an application of an ATM or the like which performs, for example, various settlements and the like to issue a card 4 from the card issuing device 1. In other words, in this embodiment, the printing data creation part 200 also functions as an execution part of the application. In this embodiment, the application is, in addition to the settlement, capable of interactively responding to a user to help to design and issue a card 4.

In addition, the printing data creation part 200 also executes a device driver and middleware for controlling the card issuing device 1. As a result, the printing data creation part 200 transmits and receives commands and their accompanied data to and from the card issuing device 1. Further, the printing data creation part 200 transmits various commands and data when settlement and issuing of a card 4 is to be performed. In addition, the printing data creation part 200 is also capable of transmitting a card reading command for performing reading of information stored in a card 4, a card writing command for writing information to the card 4 and the like.

The mode setting part 210 is capable of setting a normal mode or a high speed mode as a mode of a printing speed (hereinafter, referred to as a "printing mode"). The normal mode is a mode in which, after a card 4 is conveyed by the medium conveyance part 14 and is detected by the sensor 16, the card 4 is conveyed at a first speed which is a normal speed to align the card 4 and printing is performed at the first speed. The high speed mode is a mode in which printing is performed at a second speed higher than the first speed. The mode setting part 210 is capable of setting the normal mode or the high speed mode in an attribute setting 301 of the printing data 300. More specifically, in this embodiment, as an example, the first speed is 1 ms (millisecond)/1 L (line) for the printing data 300, and the second speed is 4 ms/L, in other words, the four-times speed.

In addition, the mode setting part 210 is capable of setting an appropriate printing mode according to an attribute of the printing data 300. Specifically, for example, in a case that a storage capacity of the printing data 300 is data smaller than a specific capacity, the mode setting part 210 is capable of setting the attribute setting 301 to the high speed mode. The specific capacity is a capacity depending on a communication speed. Specifically, for example, a storage capacity may be set as the specific capacity which is capable of receiving all printing data 300 before a time period has elapsed until a conveyed card 4 is contacted with the print head 13. In other words, the specific capacity is a capacity capable of receiving all printing data 300 before a time period has elapsed which is obtained by adding the specific time to a time after a card 4 is discharged from the hopper unit 15 and is conveyed to the sensor 16 (hereinafter, referred to as a "moving time"). In other words, data whose storage capacity is small may become not more than the specific capacity. More specifically, in a case that the printing data 300 is single color data for single color printing with a low resolution, the mode setting part 210 may be set in a high speed mode. The single color printing includes black-and-white printing. On the other hand, in a case of color printing data 300 for color printing or high-resolution data, the mode setting part 210 may be set in a low speed mode.

Further, in this embodiment, the control part 10 of the card issuing device 1 stores printing data 300 transmitted from the host apparatus 2 in the built-in storage part 11. The control part 10 is capable of printing on a card 4 based on the stored printing data 300.

In this embodiment, for example, in a case of black-and-white printing or single color printing, the control part 10 performs printing only once based on single color bitmap data included in the printing data 300. In a case of color printing, the control part 10 performs printing according to bitmap data for each color included in the printing data 300 every time a card 4 is conveyed a plurality of times. In addition, the control part 10 is also capable of performing printing of an overcoat layer included in the printing data 300.

In this embodiment, in a case that the control part 10 makes the medium conveyance part 14 convey a card 4 at a first speed and detects that the sensor 16 is turned on, the control part 10 makes the print head 13 start to move to a printing position by the head drive part 17. In this case, in a case that a high speed mode is set, the control part 10 controls to synchronously drive the medium conveyance part 14 and the ribbon feeding part 18 so that printing on a card 4 is performed at a second speed after the print head 13 is contacted with the card 4.

In addition, when the control part 10 receives an instruction to take out a card 4 from the medium storage part where cards 4 are stored, the control part 10 may start to acquire printing data 300 to be printed by the print head 13 from the host apparatus 2. In this embodiment, in a case that the control part 10 receives a command of issuing and printing of a new card 4 from the host apparatus 2, the control part 10 may immediately start to acquire printing data 300 from the host apparatus 2.

In addition, in a case that the normal mode is set, when the print head 13 is contacted with a card 4, the control part 10 may stop the medium conveyance part 14 and the ribbon feeding part 18 to set in a stand-by state (hereinafter, referred to as a "stand-by stop") until acquisition of printing data 300 is completed. According to this configuration, after printing data 300 is acquired, printing is executed in the normal mode. On the other hand, in a case that a high speed mode is set, when the print head 13 is contacted with a card 4, the control part 10 may control so as not to perform a stand-by stop even in the middle of acquisition of printing data 300.

In addition, the control part 10 may calculate an expected acquisition time of printing data 300 based on an attribute of the printing data 300 and a communication speed with the host apparatus 2. Furthermore, the control part 10 may calculate the moving time. In this embodiment, the moving time may be changed according to a position of the hopper unit 15. Specifically, the moving time of the hopper unit 15 on a front side may be shorter than that of the hopper unit 15 on a rear side.

In this embodiment, the control part 10 may control so as not to perform a stand-by stop when the moving time is shorter than an expected acquisition time. For example, in a case that printing data 300 are not more than the above-mentioned specific capacity, the control part 10 assumes that the moving time becomes more than the expected acquisition time and controls so as not to perform a stand-by stop regardless of a printing mode.

The printing data 300 is image data which is printed on a card 4 by the print head 13. In this embodiment, bitmap data according to a resolution (dpi) of the print head 13 is used as the printing data 300. The bitmap data may be, for example, bitmap data of a single color such as black and white. Alternatively, the printing data 300 may be bitmap data of colors of a complementary color series, i.e., "C" (Cyan), "M" (Magenta), "Y" (Yellow) and "K" (black, Key plate), or colors of a primary color series, i.e., "R" (Red), "G" (Green) and "B" (Blue). In addition, the bitmap data may include bitmap data for printing an overcoat layer.

Further, the bitmap data of printing data 300 may be data such as Windows (registered trademark) BMP (Bitmap Image file) format, TIFF (Tagged Image File Format) format or PNG (Portable Network Graphic) format and may be not compressed or compressed with run length or LZW (Lempel-Ziv-Welch). In accordance with an embodiment of the present invention, bitmap data may be irreversible compression bitmap data such as JPG format. In addition, the number of bits of each color of printing data 300 may be, for example, 8 bits (0-255), 16 bits (0-65536) or the like, and may be a logarithmic scale or the like. In addition, the printing data 300 may include other bitmap data for special printing.

As a specific example in this embodiment, as a size of the printing data 300, for example, black-and-white or color bitmap data whose original size is 960 (lateral)×600 (longitudinal) pixels at 300 dpi is used. In other words, in this size, one pixel is about 0.084 mm and its aspect ratio becomes 1:1. The printing data 300 may further set high-definition data such as 600 dpi or 1200 dpi as high-resolution data.

In this embodiment, the printing data 300 is set with attribute setting 301. The attribute setting 301 may include data such as a storage capacity of the printing data 300, color setting of a color or a single color as described above, a conveyance speed, a strobe value, a temperature correction value, an output gradation value. In addition, the attribute setting 301 may include setting values for appropriately printing depending on states of other ink ribbons 3 for printing.

In this embodiment, the control part 10 of the card issuing device 1 executes a control program stored in the storage part 11 to function as described above. Further, the control part 20 of the host apparatus 2 executes a control program stored in the storage part 21 to function as the printing data creation part 200 and the mode setting part 210. Further, the respective parts of the card issuing device 1 and the host apparatus 2 described above are hardware resources which execute a card reader control method in this embodiment. In accordance with an embodiment of the present invention, a part or arbitrary combination of the above-mentioned functional configuration parts may be configured of circuits or hardware by using an IC, a programmable logic, an FPGA (Field-Programmable Gate Array) or the like.

[Card Issuing Processing by Card Issuing System "X"]

Figure 3:
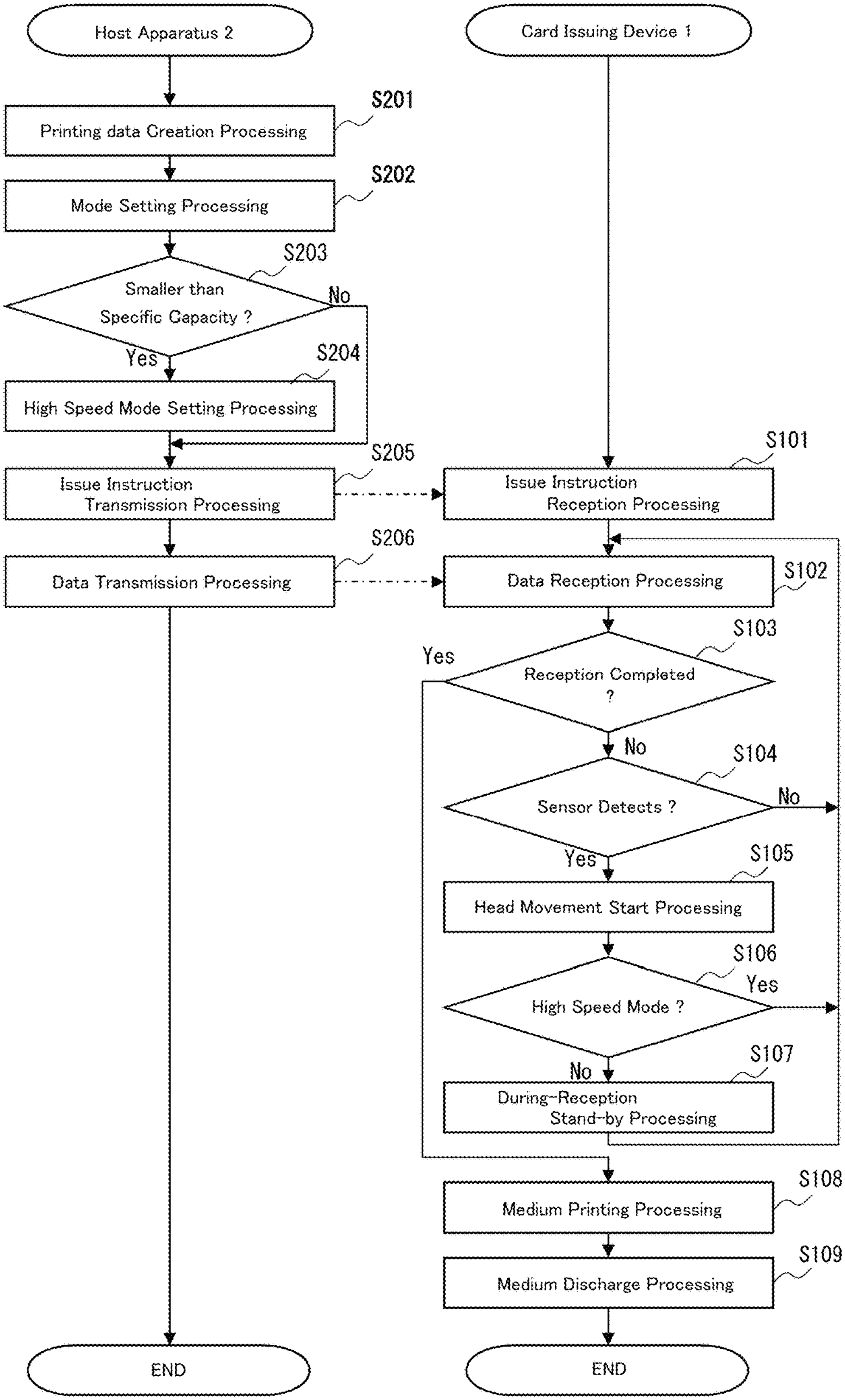
FIG. 3 is a flow chart showing card issuing processing in accordance with an embodiment of the present invention.

Next, card issuing processing of the card issuing system "X" in accordance with an embodiment of the present invention will be described below with reference to FIGS. 3 through 4C. In the card issuing processing in this embodiment, the host apparatus 2 executes an application for an ATM or the like, and a card 4 is printed and issued by using the card issuing device 1. Therefore, first, printing data 300 is created in the host apparatus 2 and mode setting is performed. Then, the printing data 300 is transmitted from the host apparatus 2 and is received by the card issuing device 1. Next, the card issuing device 1 conveys a medium at the first speed by the medium conveyance part 14. After that, when it is detected that the sensor 16 is turned on, movement of the print head 13 to the printing position is started by the head drive part 17. In this embodiment, in a case that a high speed mode is set, after the print head 13 is contacted with the medium, the medium conveyance part 14 and the ribbon feeding part 18 are controlled so as to be synchronously driven so that, printing to the medium is performed at the second speed.

The card issuing processing in this embodiment is performed so that, in the card issuing device 1, the control part 10 and control means of respective parts mainly execute a control program (not shown) stored in the storage part 11 and, in the host apparatus 2, the control part 20 executes a control program (not shown) stored in the storage part 21, in cooperation with the respective parts by using hardware resources. Next, the card issuing processing in this embodiment will be described below for each operation with reference to the flow chart shown in FIG. 3.

(Operation S201)

First, the printing data creation part 200 of the host apparatus 2 performs printing data creation processing. In this embodiment, the printing data creation part 200 executes an application for performing card issue and printing in an ATM or the like. The application may be executed in response to an instruction of a user who operates the ATM or the like, a card transaction of a card 4, a point card issue and the like.

Next, the printing data creation part 200 receives an operation by a user through a touch panel, ten keys or the like to create printing data 300 for card issue. In this case, the printing data creation part 200 may read out default (specified) image data stored in the storage part 21 and copy or the like to the printing data 300. In this case, the printing data creation part 200 may acquire ink ribbon information, information of a kind of a card 4 stored in each hopper unit 15 and the like from the card issuing device 1 to create appropriate printing data 300.

In addition, the printing data creation part 200 may convert prescribed image data of vector data into bitmap data suitable for a format of printing data 300. In addition, in this case, the printing data creation part 200 may be configured that a user's face photograph is taken by a camera not shown and is added to the printing data 300.

(Operation S202)

Next, the mode setting part 210 performs mode setting processing. The mode setting part 210 performs setting a normal mode or a high speed mode in the attribute setting 301 of the printing data 300. In this case, the mode setting part 210 is capable of setting according to an instruction of a provider of an ATM or the like or a user. In other words, in a case that high-speed and quick issuing is instructed, the mode setting part 210 is capable of setting in a high speed mode. In other cases, the mode setting part 210 is capable of setting in a normal mode.

(Operation S203)

Next, the mode setting part 210 determines whether a data capacity of the printing data 300 is smaller than the specific capacity or not. The mode setting part 210 refers to a data capacity of the printing data 300 and, in a case that the printing data 300 is single color data or the like and smaller than the specific capacity, the mode setting part 210 determines "Yes". The mode setting part 210 determines "No" in a case that the data capacity is not less than the specific capacity due to color printing data 300, high-resolution data or the like. In addition, the mode setting part 210 may determine "No" also in a case that a normal mode is especially designated in order to write with high definition and a high degree of quality. In the case of "Yes", the mode setting part 210 proceeds the processing to the operation S204. In the case of "No", the mode setting part 210 proceeds the processing to the operation S205.

(Operation S204)

When the printing data 300 is smaller than the specific capacity, the mode setting part 210 performs high speed mode setting processing. When a capacity of the printing data 300 is smaller than the specific capacity, the mode setting part 210 performs setting of a high speed mode in the attribute setting 301 of the printing data 300.

(Operation S205)

In this operation, the printing data creation part 200 performs issue instruction transmission processing. The printing data creation part 200 executes a device driver, middleware and the like and transmits a command of issuing and printing of a new card 4 to the card issuing device 1 through the transmitting and receiving part 22. In this embodiment, this command may be added with at least a part of data of the attribute setting 301 of the printing data 300 as additional data.

(Operation S101)

Next, the control part 10 of the card issuing device 1 performs issue instruction reception processing. The command of issuing and printing is received by the control part 10 through the common board 12. The control part 10 analyzes the command to discharge a card 4 from an appropriate hopper unit 15 and starts conveyance of the card 4 in the conveyance passage. In this embodiment, when additional data is added to the command, the control part 10 calculates an expected acquisition time while also considering a communication method and the like. In addition, the control part 10 also calculates the moving time.

Figures 4A, 4B, 4C:
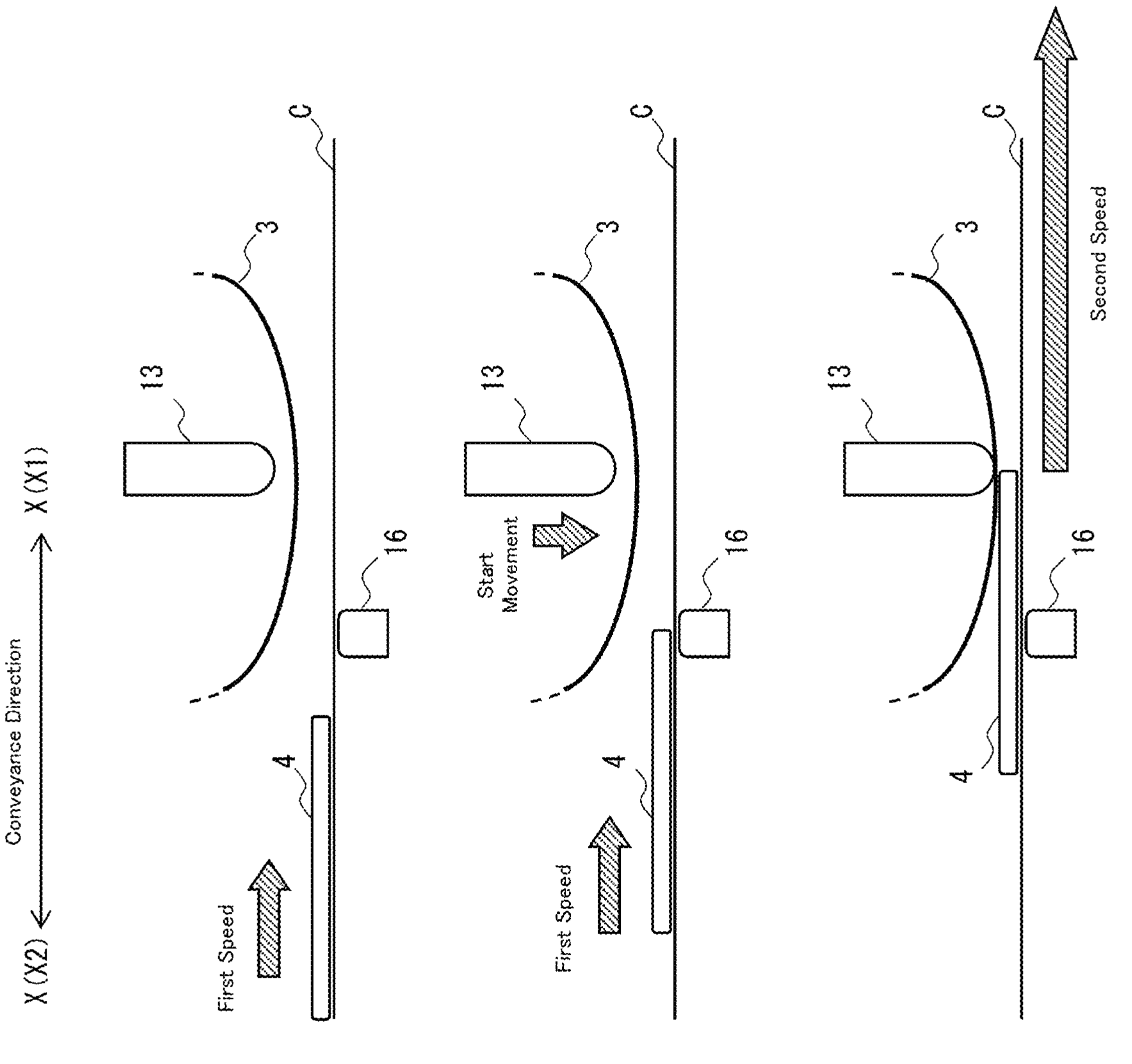
FIGS. 4A, FIG. 4B and FIG. 4C are conceptual views showing printing of a card in the card issuing processing shown in FIG. 3.

FIG. 4A shows an example in a state that a new card 4 which is not printed is discharged to the conveyance passage "C" from the hopper unit 15 and the card 4 is started to be conveyed. In this state, the control part 10 starts conveyance of the card 4 at the first speed to a front side ("X1" direction side) in the conveyance direction. In this case, the control part 10 may, for example, convey the card 4 at a conveyance speed faster than the first speed.

(Operation S206)

Next, the printing data creation part 200 of the host apparatus 2 performs data transmission processing. The printing data creation part 200 transmits printing data 300 selected by the printing data creation part 200 to the card issuing device 1 through a transmission command. The printing data creation part 200 transmits the printing data 300 as data accompanying the command to the card issuing device 1 with a USB or the like.

(Operation S102)

Next, the control part 10 of the card issuing device 1 performs data reception processing. In this embodiment, a control means of the common board 12 receives the printing data 300 from the host apparatus 2. In this case, the control means of the common board 12 may, for example, directly store the printing data 300 in the storage part 11 by using a DMA or the like. Alternatively, the control means of the common board 12 may directly transmits the printing data 300 to the control part 10. The control part 10 is capable of decoding the received printing data 300 and the like.

(Operation S103)

Next, the control part 10 determines whether the reception is completed or not. The control part 10 determines "Yes" when the reception of the printing data 300 is completed. The control part 10 determines "No" in a case that the reception of the printing data 300 is not completed. In the case of "Yes", the control part 10 proceeds the processing to the operation S107. In the case of "No", the control part 10 proceeds the processing to the operation S104.

(Operation S104)

In a case that the reception of the printing data 300 is not completed, the control part 10 determines whether the card 4 is detected by the sensor or not. The control part 10 refers to a signal of the sensor 16 and, in a case that the card 4 is detected by the sensor 16, the control part 10 determines "Yes". The control part 10 determines "No" in a case that the card 4 is not detected. In the case of "Yes", the control part 10 proceeds the processing to the operation S105. In the case of "No", the control part 10 returns the processing to the operation S102 and continues the reception of the printing data 300.

(Operation S105)

In a case that the card 4 is detected by the sensor 16, the control part 10 performs head movement start processing. The control part 10 drives a drive means by the head drive part 17 to start movement of the print head 13 from a standby position to a printing position. In addition, the control part 10 causes the medium conveyance part 14 to convey the card 4 to a front side ("X1" direction side) at the first speed. Specifically, the control part 10 adjusts an interruption period for a drive means such as a stepping motor of the medium conveyance part 14 so that the card 4 is conveyed at the first speed at a timing of the detection of the card 4 by the sensor 16.

FIG. 4B shows a state that the card 4 is detected by the sensor 16 and the print head 13 starts moving. As described above, movement of the print head 13 from the standby position to the printing position requires the specific time.

(Operation S106)

Next, the control part 10 determines whether the high speed mode is set or not. The control part 10 refers to the attribute setting 301 of the printing data 300 and, when the high speed mode is set, the control part 10 determines "Yes". The control part 10 determines "No" when the normal mode is set. In the case of "Yes", the control part 10 returns the processing to the operation S102 and continues the reception of the printing data 300. In the case of "No", the control part 10 proceeds the processing to the operation S107.

(Operation S107)

In the case of the normal mode, the control part 10 performs during-reception stand-by processing. The control part 10 stands by until the reception of the printing data 300 is completed. In the middle of the reception, movement of the print head 13 from the standby position to the printing position may be completed. In this case, as shown in FIG. 4C, the card 4 and the print head 13 are stopped at a printing start position in a state that a tip end part on a front side of the card 4 is just contacted with the ink ribbon 3 by the print head 13.

In other words, in this embodiment, when the card 4 is driven at the first speed from the detection of the card 4 by the sensor 16, the card 4 is conveyed to the printing start position just on the specific time. In this manner, the card 4 can be aligned and matched. Further, the control part 10 stops conveyance of the card 4 at a timing when the print head 13 is contacted with the card 4 during conveyance. In this state, in a case that the reception has been already completed when the card 4 is reached to the printing start position, the control part 10 is not required to stop the conveyance.

(Operation S108)

In a case that the reception of the printing data 300 is completed, the control part 10 performs medium printing processing. The control part 10 starts printing from the printing start position in a state that the ink ribbon 3 and the card 4 are contacted with each other by the print head 13 as shown in FIG. 4C. In this case, when the normal mode is set, the control part 10 controls so that the medium conveyance part 14 and the ribbon feeding part 18 are synchronously driven at the first speed to make the card 4 print by the print head 13. In other words, in this embodiment, for example, printing is performed at a printing speed of 4 ms/L.

On the other hand, in a case that the high speed mode is set, after the print head 13 is contacted with the card 4, the control part 10 controls so that the medium conveyance part 14 and the ribbon feeding part 18 are synchronously driven by a stepping motor and printing to the card 4 is performed at the second speed. In other words, the control part 10 performs printing while accelerating to the second speed from a state that the card 4 is conveyed to the printing start position at the first speed.

In this embodiment, in a case of the high speed mode, for example, the printing speed is accelerated from 4 ms/L to 1 ms/L which is four-times speed, and printing is performed at this speed. In this case, a feeding speed of the ink ribbon 3 by the ribbon feeding part 18 and a conveyance speed of the card 4 by the medium conveyance part 14 are required to be the same as each other and thus, the control part 10 changes interruption periods or the like of these drive means to perform printing while the speeds are adjusted.

In this embodiment, in a case that color printing or printing of an overcoat layer or the like is required, the control part 10 conveys the card 4 to a rear side ("X2" direction side) to the printing start position by the medium conveyance part 14 again and simultaneously feeds out another color of the ink ribbon 3 by the ribbon feeding part 18 and continues printing to the card 4. After that, the control part 10 proceeds the processing to the operation S109.

(Operation S109)

In this operation, the print head 13 and the medium conveyance part 14 perform medium discharge processing. After the printing is completed, the print head 13 notifies a printing result to the host apparatus 2 through the common board 12. In addition, the print head 13 drives the medium conveyance part 14 to convey the card 4 to a front direction side in the conveyance passage to discharge the card 4. Therefore, a user who operates the ATM or the like is capable of acquiring the printed card 4. As a result, the card issuing processing in accordance with an embodiment of the present invention is finished.

Principal Effects in this Embodiment

When configured as described above, the following effects can be obtained. In the conventional medium issuing device, a card taken out from a hopper unit is taken into an inside of the device and, after image data for one screen is received, printing is performed, for example, at a speed of 4 ms/L. On the other hand, there is a technical need for increasing a printing speed and reducing a printing time to a card.

In order to increase a printing speed, it is conceivable that printing is performed at a speed faster than the printing speed of 4 ms/L. However, in a conventional card issuing device, there is a reason that a printing speed cannot be simply increased. Specifically, in a card issuing device, in a case that a card is not issued, the print head is required to move to a standby position so as not to contact with a card. In addition, printing is normally performed on a plastic card whose surface is slippery and thus, at a time of printing, it is required that a considerable pressure is applied to the print head to cause an ink ribbon to contact with a card. Therefore, when the print head is moved to a printing position in a state that a card is not existed, the conveyance passage is closed and thus, a card cannot be conveyed.

In order to prevent this problem, at a time of start of printing to a card, timings of driving three motors, i.e., a motor of the head drive part of the print head, a motor of the ribbon feeding part for the ink ribbon, and a conveyance motor of the medium conveyance part are required to be matched. In this case, especially, a speed of a motor of the head drive part in the print head is slower than those of other two motors and thus, unless driving is started at an appropriate timing, a printing start position may be shifted. On the other hand, when a timing of the motor for an ink ribbon is earlier, an extra ribbon is fed before printing and the printing may be failed. Therefore, conventionally, it is difficult to perform a high speed printing. The technique described in Patent Literature 1 is not capable of coping with such a problem.

In order to prevent the above-mentioned problem;

(1) A card issuing system "X" in accordance with an embodiment of the present invention is a medium issuing system including the card issuing device 1 (medium issuing device) which is a medium issuing device for issuing a card 4 (medium) and the host apparatus 2 which creates printing data 300 for the card issuing device 1. The host apparatus 2 includes the printing data creation part 200 which creates printing data 300, the mode setting part 210 which sets a normal mode for printing at a first speed and a high speed mode for printing at a second speed higher than the first speed, and the transmitting and receiving part 22 which transmits the printing data 300 to the card issuing device 1. The card issuing device 1 includes the conveyance passage where the card 4 is conveyed, the medium conveyance part 14 which conveys the card 4 in the conveyance passage, the print head 13 which brings the ink ribbon 3 into contact with the card 4 conveyed in the conveyance passage by the medium conveyance part 14 and prints on the medium, the sensor 16 which is disposed on an upstream side in the conveyance passage with respect to the print head 13, the head drive part 17 which moves the print head 13 between a standby position and a printing position, the ribbon feeding part 18 which feeds out the ink ribbon 3, and the control part 10. The control part 10 conveys the card 4 at the first speed by the medium conveyance part 14 and, when detected that the sensor 16 is turned on, the control part 10 starts to move the print head 13 to the printing position by the head drive part 17. In addition, in a case that the high speed mode is set, the control part 10 controls the medium conveyance part 14 and the ribbon feeding part 18 which are synchronously driven so that, after the print head 13 is contacted with the card 4, printing to the card 4 is performed at the second speed.

In other words, the control part 10 conveys a card 4 by the medium conveyance part 14 and, when the sensor 16 is turned on, the card 4 is conveyed at the first speed and the print head 13 is started to move to the printing position by the head drive part 17 and, in a case that a high speed mode is set, after the print head 13 is contacted with the card 4, the control part 10 controls to synchronously drive the medium conveyance part 14 and the ribbon feeding part 18 so as to perform printing on the card 4 at the second speed.

Specifically, in a case that seamless printing is to be performed from the beginning at a high speed, if the print head 13 starts to move from a standby position to a printing position at a timing of detection of a sensor 16 at the printing start position, the print head 13 does not reach the printing start position in time. Therefore, when the sensor 16 detects the card 4, the card 4 is conveyed at the first speed which is a normal speed. After that, at a timing when the print head 13 is contacted with the card 4, the card speed can be changed to the second speed. According to the above-mentioned configuration, based on the detection of the sensor 16, the head drive part 17 of the print head 13, the ribbon feeding part 18 of the ink ribbon 3, and the medium conveyance part 14 are driven at appropriate timings to surely position the card 4 at the printing start position and then, the card 4 can be conveyed at a high speed. Therefore, for example, the printing speed can be improved four times from 4 ms/L to 1 ms/L to perform printing.

As result, the card 4 is conveyed at the first speed and thereby, alignment and matching of the card 4 with the print head 13 can be surely performed and, after aligned and matched, a printing time can be reduced by setting the conveyance speed to the second speed. In this case, a drive means such as a stepping motor is used and the position is synchronized by controlling the number of operations or the like and, even if the speed is changed, the printing start position can be maintained. In other words, conveyance of the card 4 is changed stepwise as required and thus, a conveyance speed can be increased except a place which is required for matching a printing position of the card 4 and, therefore, a printing time can be reduced. In addition, a structure such as a mechanism of the print head 13 is not required to change and thus, printing can be performed at a high speed while reducing a cost.

Further, in the conventional card issuing device, after conveyance of a card to the conveyance passage is started, reception of printing data is started. Therefore, in a case of data whose storage capacity is large such as color printing data, reception is not performed in time and thus, a card 4 is required to stop after having been conveyed to the printing start position.

In order to prevent the above-mentioned problem;

(2) In the card issuing device 1 described in the above-mentioned structure (1), when the control part 10 receives an instruction for taking out a card 4 from a medium storage part in which cards 4 are stored, the control part 10 starts acquiring printing data 300 to be printed by the print head 13 from the host apparatus 2.

According to this configuration, an instruction for issuing and printing a new card 4 is received and, at a time when the card 4 is started to be discharged from the hopper unit 15, reception of the printing data 300 is started. In other words, the printing data 300 are received after start of conveyance of the card 4 and before printing. As a result, before completion of conveyance of the card 4 discharged from the hopper unit 15 to the printing start position of the card issuing device 1, most printing image data can be received. Therefore, a waiting time for printing can be reduced. In addition, conveyance of a card 4 is not required to stop for waiting for reception and thus, a printing time can be reduced.

Further, in the conventional card issuing device, in a case of color printing, bitmap data of each color is received each time from a host apparatus. Therefore, a slight loss is temporally generated every time. On the other hand, in the card issuing device 1 in accordance with this embodiment of the present invention, image data of colors or the like are collectively received during conveyance of the card 4 before printing. According to this configuration, a reception waiting time of the printing data 300 before printing can be reduced.

(3) In the card issuing device 1 described in the above-mentioned structure (2), the control part 10 controls so that, in a case that a normal mode which prints at the first speed is set, when the print head 13 is contacted with the card 4, the medium conveyance part 14 and the ribbon feeding part 18 are stopped until acquisition of the printing data 300 is completed and, in a case that a high speed mode is set, when the print head 13 is contacted with the card 4, the medium conveyance part 14 and the ribbon feeding part 18 are not stopped even in the middle of acquisition of the printing data 300.

According to this configuration, at the time of printing when a card is to be issued, in the high speed mode, a speed of printing can be increased without stopping the card 4 at the printing start position. In addition, in the case of the high speed mode, the card 4 is not stopped different from the normal mode and can be immediately accelerated from the first speed to the second speed and thus, a time until printing completion can be reduced.

(4) In the card issuing device 1 described in the above-mentioned structure (2) or (3), the control part 10 calculates an expected acquisition time of the printing data 300 based on an attribute of the printing data 300 and a communication speed with the host apparatus 2 and, in a case that a moving time until the print head 13 is contacted with the card 4 after the print head 13 starts moving to the printing position is shorter than the expected acquisition time, when the print head 13 is contacted with the card 4, the control part 10 controls not to stop the medium conveyance part 14 and the ribbon feeding part 18.

According to this configuration, at the time of printing when a card is to be issued, conveyance of the card 4 is not stopped at the printing start position and thus, a speed of the printing can be increased. In this case, even in the normal mode, the printing speed can be increased similarly to the high speed mode. Further, in the high speed mode, a conveyance speed of the card 4 can be immediately accelerated to the second speed from the printing start position and thus, a time until printing completion can be reduced.

(5) A card issuing system "X" in accordance with an embodiment of the present invention is a medium issuing system which includes the card issuing device described in one of the above-mentioned structures (1) through (4) and, in a case that the printing data 300 including black-and-white data is data whose storage capacity is smaller than the specific capacity, the mode setting part 210 sets the high speed mode.

According to this configuration, at the time of printing when a card is to be issued, a mode of the printing data 300 whose storage capacity is small can be changed to a high speed mode and printing is performed. As a result, a waiting time for issuing a card 4 can be automatically reduced and convenience for a user of an ATM or the like can be enhanced. Further, a developer of the host apparatus 2 is not required to separately designate a high speed mode. Therefore, a development cost can be reduced.

OTHER EMBODIMENTS

In the embodiment described above, the second speed is a speed faster than the first speed and, as an example, the fast speed is four times of the normal mode speed. However, the second speed may be set as a variable speed by the attribute setting 301 of the printing data 300. For example, it may be configured that, in a case that the printing data 300 is a single color, the fast speed is four times but, in a case of color data including a photograph or the like, the fast speed is set to double speed.

In addition, it may be configured that, in the case of color data, when printing of “Y” (yellow) whose printing deviation or the like is less conspicuous is to be performed, the printing speed is set to four-times speed and, when printing of “K” (black) whose printing deviation is easily conspicuous is to be performed, the printing speed is set to one to two-times speed. Furthermore, in a case that the attribute setting 301 is set with high-definition data or a face photograph, it may be configured that printing is performed at a speed slower than the first speed. Further, it may be configured that only a portion of a photograph is driven at a low speed for every printing color.

According to this configuration, printing quality is maintained and, while printing is performed with a high degree of accuracy, the printing can be performed at a high speed. Further, occurrence of minute deviation due to speed variation and the like and printing variation due to variation of resolution can be suppressed and thus, printing on a card 4 is performed with a high degree of accuracy.

In the embodiment described above, in a case that the expected acquisition time of the printing data 300 is not more than the moving time relating to conveyance of a card 4 and movement of the print head 13, the mode is changed to the high speed mode. On the other hand, in a case that the expected acquisition time is longer than the moving time, it may be configured that a position of the corresponding hopper unit 15 is changed to a rear side and thereby, the moving time is made longer so that the expected acquisition time is in time. As a result, printing of a card 4 can be started without stopping and standing by the card 4 at the printing start position and thus, a time to completion of the printing can be reduced.

Alternatively, it is determined that the expected acquisition time is longer than the moving time in the high speed mode, the printing data 300 itself may be changed. In other words, even in the case of the printing data 300 of colors or the like, the printing data 300 may be compressed and, instead of bitmap data, the printing data 300 may be transmitted to the card issuing device 1 as data including vector data such as PDF (Portable Document Format), PS (Post Script), and object-unit data.

In addition, in the embodiment described above, the high speed mode and the normal mode are set in the host apparatus 2. However, the high speed mode and the normal mode may be capable of being set in the control part 10 of the card issuing device 1. In this case, the control part 10 analyzes additional data of a command and, in a case that the expected acquisition time is longer than the moving time, it may be configured to request change of the printing data 300. According to this configuration, it is capable of coping with various configurations.

In the embodiment described above, when driven in the high speed mode, control of a lightness value and density of the printing data 300 is not described. In a case that density becomes lower when driven at a high speed, control may be performed so that the density is increased. In this case, instead of merely setting the density to “n”-times, density control can be performed according to a stepwise or specific density change curve depending on a lightness value of a pixel of the printing data 300. As a result, quality of printing on a card 4 can be further enhanced.

In the embodiment described above, as an example, printing is performed on a card 4 mainly by a thermal transfer type or a sublimation type printer which uses an ink ribbon 3. However, another printing type printer such as a thermal printer using a thermo sensitive paper, an ink jet printer, a dot matrix printer, a printer of an electronic dry photograph system, a laser marking type printer, or a melting type or an ultraviolet curable type 3D printer can be used as a printer which conveys a card 4. In addition, instead of a printer for cut-form printing, a printer for roll sheet may be used. Further, instead of a color printer, a black-and-white printer may be used. Further, the density control method can be also changed according to these printing systems. According to this configuration, printing on a card 4 corresponded to various configurations can be performed.

In the embodiment described above, as an example, the host apparatus 2 is a main body of an ATM or the like. However, the host apparatus 2 may be a PC or a smart phone for designing a card 4. In this case, a PC or a smart phone is installed with an application for designing a card 4 and may be connected with a card issuing device 1 by wire or wirelessly.

In addition, in the embodiment described above, as an example, the printing data 300 is directly transmitted from the host apparatus 2 to the card issuing device 1 which is connected with the host apparatus 2. However, the printing data 300 is encrypted or the like by a common key or a public key and then, the printing data 300 may be transmitted to the card issuing device 1 through a network. Further, the printing data 300 may be acquired from a cellular phone of a user, a server on a so-called cloud, an NAS (Network Attached Storage) or the like different from the host apparatus 2. According to this configuration, it is capable of coping with various configurations. Further, when encrypted, security can be improved.

Further, it may be configured that a printing unit including the print head 13 of the card issuing device 1 is not mounted on the card issuing device 1 and is connected by a USB, wirelessly or the like. Alternatively, it may be configured that the card issuing device 1 is not connected with the host apparatus 2 in a housing and is connected with a host apparatus 2 such as a PC or a smart phone by a USB, wirelessly or the like. In addition, the card issuing device 1 may be capable of printing in a so-called “stand-alone” manner which is not connected with the host apparatus 2. In this case, a stand-alone card issuing device 1 may be temporarily connected with a host apparatus 2 or a terminal for maintenance to acquire printing data 300.

In the embodiment described above, as an example of a medium, printing is performed on a card 4. However, in addition to a card 4, for example, a parking ticket, an admission ticket, a ticket for train or airplane, or other tickets, a label printed by a label printer, a receipt, or other media required to be printed by a printing device, for example, using conductive ink such as RFID (Radio Frequency IDentifier) can be issued by a similar configuration. When configured as described above, various media can be utilized.

Further, in the embodiment described above, the configuration relating to issuing of a card 4 in the card issuing device 1 is mainly described. However, the card issuing device 1 may include a function of a card reader having a head or the like for reading information stored in a card 4. The head or the like includes, for example, a magnetic head, an encryption magnetic head, an IC contact, an electromagnetic induction antenna or the like. In a case of a magnetic head, a card 4 is contacted and slid and thereby, magnetic information recorded in a magnetic stripe provided on the card 4 can be read and magnetic information can be written in the magnetic stripe. In an IC contact, an electromagnetic induction antenna or the like, information stored in an IC which is built in a card 4 can be read and written by contacting with an IC contact of a card 4, electromagnetic induction or the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A medium issuing device for printing and issuing a medium, the medium issuing device comprising:

a conveyance passage where the medium is conveyed;

a medium conveyance part which conveys the medium in the conveyance passage;

a print head which brings an ink ribbon into contact with the medium conveyed in the conveyance passage by the medium conveyance part and prints on the medium;

a sensor which is disposed on an upstream side of the conveyance passage with respect to the print head;

a head drive part which moves the print head between a standby position and a printing position;

a ribbon feeding part which feeds out the ink ribbon; and a control part which controls so that:

when detected that the sensor is turned on, the medium is conveyed at a first speed by the medium conveyance part, and the print head is started to move to the printing position by the head drive part; and in a case that a high speed mode which prints at a second speed higher than the first speed is set, after the print head is contacted with the medium, the medium conveyance part and the ribbon feeding part are synchronously driven so that printing to the medium is performed at the second speed, wherein when the control part receives an instruction that the medium is taken out from a medium storage part in which the medium is stored, the control part starts to acquire printing data to be printed by the print head from a host apparatus, in a case that a normal mode in which printing is performed at the first speed is set, when the print head is contacted with the medium, the control part stops the medium conveyance part and the ribbon feeding part until acquisition of the printing data is completed, and in a case that the high speed mode is set, when the print head is contacted with the medium, the control part controls so as not to stop the medium conveyance part and the ribbon feeding part even in a middle of acquisition of the printing data.

2. The medium issuing device according to claim 1, wherein the control part calculates an expected acquisition time of the printing data based on an attribute of the printing data and a communication speed with the host apparatus, and in a case that a moving time until the medium which is conveyed is contacted with the print head is shorter than the expected acquisition time, when the print head is contacted with the medium, the control part controls so as not to stop the medium conveyance part and the ribbon feeding part.

3. A medium issuing system comprising:

a medium issuing device for printing and issuing a medium; and a host apparatus which transmits printing data for the medium issuing device;

wherein the host apparatus comprises:

a printing data creation part which creates the printing data;

a mode setting part which sets a normal mode in which printing is performed at a first speed and a high speed mode in which printing is performed at a second speed higher than the first speed; and a transmission part which transmits the printing data to the medium issuing device;

the medium issuing device comprises:

a conveyance passage where the medium is conveyed;

a medium conveyance part which conveys the medium in the conveyance passage;

a print head which brings an ink ribbon into contact with the medium conveyed in the conveyance passage by the medium conveyance part and prints on the medium;

a sensor which is disposed on an upstream side of the conveyance passage with respect to the print head;

a head drive part which moves the print head between a standby position and a printing position;

a ribbon feeding part which feeds out the ink ribbon; and a control part which controls so that:

when detected that the sensor is turned on, the medium is conveyed at the first speed by the medium conveyance part, and the print head is started to move to the printing position by the head drive part; and in a case that the high speed mode is set, after the print head is contacted with the medium, the medium conveyance part and the ribbon feeding part are synchronously driven so that printing to the medium is performed at the second speed.

4. The medium issuing system according to claim 3, wherein in a case that the printing data is data including black-and-white data whose storage capacity is smaller than a specific capacity, the mode setting part sets the high speed mode.

5. A medium issuing method which is executed by a medium issuing device for printing and issuing a medium, wherein the medium issuing device comprises:

a conveyance passage where the medium is conveyed;

a medium conveyance part which conveys the medium in the conveyance passage;

a print head which brings an ink ribbon into contact with the medium conveyed in the conveyance passage by the medium conveyance part and prints on the medium;

a sensor which is disposed on an upstream side of the conveyance passage with respect to the print head;

a head drive part which moves the print head between a standby position and a printing position;

a ribbon feeding part which feeds out the ink ribbon; and a control part; and wherein the control part controls so that:

when detected that the sensor is turned on, the medium is conveyed at a first speed by the medium conveyance part, and the print head is started to move to the printing position by the head drive part; and in a case that a high speed mode is set, after the print head is contacted with the medium, the medium conveyance part and the ribbon feeding part are synchronously driven so that printing to the medium is performed at a second speed.

* * * * *